United States Patent
Lippenberger et al.

(10) Patent No.: US 9,518,615 B2
(45) Date of Patent: Dec. 13, 2016

(54) COMPONENT PART, DEVICE AND METHOD FOR DETERMINING AN AXIAL POSITION OF A COMPONENT PART AND FOR DETERMINING A ROTARY SPEED OF THE COMPONENT PART

(71) Applicant: ZF Friedrichshafen AG, Friedrichshafen (DE)

(72) Inventors: Ingo Lippenberger, Ravensburg (DE); Stefan Hakspiel, Meckenbeuren (DE); Christoph Braun, Uhldingen-Muehlhofen (DE); Dominic Bezikofer, Friedrichshafen (DE); Frank Schneider, Waldburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 69 days.

(21) Appl. No.: 14/522,818

(22) Filed: Oct. 24, 2014

(65) Prior Publication Data
US 2015/0114788 A1    Apr. 30, 2015

(30) Foreign Application Priority Data
Oct. 24, 2013    (DE) .................. 10 2013 221 673

(51) Int. Cl.
*F16D 11/14*    (2006.01)
*G01P 3/486*    (2006.01)
(Continued)

(52) U.S. Cl.
CPC .............. *F16D 11/14* (2013.01); *G01D 5/12* (2013.01); *G01D 5/145* (2013.01); *G01P 3/486* (2013.01); *F16D 2300/18* (2013.01); *G01B 7/30* (2013.01)

(58) Field of Classification Search
None
See application file for complete search history.

(56) References Cited

U.S. PATENT DOCUMENTS

| | | | | |
|---|---|---|---|---|
| 5,748,111 | A * | 5/1998 | Bates ..................... | G01D 5/347 250/231.14 |
| 2010/0301846 | A1* | 12/2010 | Lee ........................ | G01P 3/487 324/207.25 |
| 2012/0119730 | A1* | 5/2012 | Sanchez Exposito ... | G01D 5/14 324/207.25 |

FOREIGN PATENT DOCUMENTS

| | | |
|---|---|---|
| DE | 10 2006 045 732 A1 | 4/2008 |
| DE | 10 2008 058 167 A1 | 6/2010 |
| DE | 10 2010 056 271 A1 | 6/2012 |

OTHER PUBLICATIONS

German Patent Office Search Report, Feb. 14 2014.

* cited by examiner

*Primary Examiner* — Mark Manley
(74) *Attorney, Agent, or Firm* — Dority & Manning, P.A.

(57) ABSTRACT

A component of a transmission device, which rotates around a central axis and is adjustable in an axial direction, includes with an encoder contour on the circumference of the component that interacts with a sensor device. The encoder contour features at least one area provided for calculating the axial position of the component, whereas a surface of the first area is designed with a varying radial extension along the axial direction relative to the central axis. The encoder contour has second areas for calculating the rotational speed of the component, whereas a slope of a radial surface of the second areas in the axial direction is differentiated from a slope of the surface of the first areas in the axial direction.

(Continued)

In the circumferential direction of the component, the encoder contour is designed alternately with first areas and second areas.

12 Claims, 7 Drawing Sheets

(51) Int. Cl.
    *G01D 5/14*          (2006.01)
    *G01D 5/12*          (2006.01)
    *G01B 7/30*          (2006.01)

COMPONENT PART, DEVICE AND METHOD FOR DETERMINING AN AXIAL POSITION OF A COMPONENT PART AND FOR DETERMINING A ROTARY SPEED OF THE COMPONENT PART

FIELD OF THE INVENTION

The invention relates to a component, in particular a shifting element of a transmission device, which rotates around a central axis and is adjustable in an axial direction and features an encoder contour revolving on the circumference of the component and provided for interacting with a sensor device, and a method for calculating the axial position and a rotational speed of a rotatably mounted component that is adjustable in an axial direction.

BACKGROUND

A claw of a transmission device designed as a hollow shaft is known from practice; through the axial adjusting movement, this is displaceable between a first end position, in which the claw is arranged rotatably in respect of a shaft of the transmission device, and a second end position, in which the claw is connected in a torque-proof manner to the shaft of the transmission device. If a shifting request, i.e., a transition movement of the claw between the first end position and the second end position, is calculated by an electronic transmission control unit, for example, due to increasing rotational speeds, in order to carry out the displacement movement of the claw, on the one hand, it is necessary to know the current position of the claw in an axial direction and the existing differential rotational speed between the shaft and the claw.

In order to determine the position of the claw in an axial direction, a known method is to design the claw with an encoder contour revolving on the circumference of the claw and to provide a sensor unit that interacts with the encoder contour. Thereby, one surface of the encoder contour is designed with a revolving v-shaped cross section. For the calculation of the axial position of the claw, the sensor unit features two measuring devices, in particular so-called "Hall cells," spaced apart from each other in the axial direction of the component, and one permanent magnet arranged in respect of the claw on a side turned away from the measuring devices. By means of the measuring devices, a gap between an area of the sensor unit featuring the respective measuring device and the surface of the measuring signal reproducing the encoder contour can be calculated. A sensor signal formed through the difference of the two measuring signals is transformed into a useful signal by a filter device that eliminates interference; from the useful signal, the respective current axial position of the claw can be calculated.

With known transmission devices, the current rotational speed of a claw is calculated, for example, through a rotational speed sensor arranged on an additional component of the transmission device, whereas the rotational speed of the claw can be calculated through known fixed transmission ratio relationships from the rotational speeds measured by such rotational speed sensor. If it is not possible to calculate the rotational speed of the claw in such a manner, because, for example, there are undefined transmission ratio relationships, the rotational speed of the claw is to be calculated directly in the area of the claw. Accordingly, an additional encoder contour is provided in the area of the claw; this interacts with an additional sensor device. Through the provision of the additional encoder contour, the need for installation space for the claw in the axial direction of the claw is disadvantageously large.

SUMMARY OF THE INVENTION

As such, this invention is subject to a task of providing a rotatable and axially adjustable component, a device with such a component and a sensor device and a method for calculating an axial position and for calculating the rotational speed of a rotatable and axially adjustable component with a sensor device, for which, for the calculation of an axial position and a calculation of the rotational speed of the component, only a small amount of installation space in the axial direction of the component is necessary. Additional objects and advantages of the invention will be set forth in part in the following description, or may be obvious from the description, or may be learned through practice of the invention.

In accordance with the invention, this task is solved with a component with the characteristics as described herein.

The component in accordance with the invention, in particular a shifting element of a transmission device, which is rotatable around a central axis and is adjustable in an axial direction, is designed with an encoder contour revolving on the circumference of the component and provided for interacting with a sensor device, which features at least one first area provided for the calculation of a position of the component in an axial direction, whereas a surface of the first area in the axial direction of the component is designed with a varying radial extension in respect of the central axis.

In accordance with the invention, the encoder contour features several second areas for calculating the rotational speed of the component, whereas a slope of a radial extension of a surface of the second areas in the axial direction of the component is differentiated from a slope of a radial extension of the surface of the first areas in the axial direction of the component, and the encoder contour in the circumferential direction of the component is designed alternately with first areas and second areas.

For calculating an axial position of the component and for calculating the rotational speed of the component, advantageously, only a small amount of installation space is necessary in an axial direction, since both the axial position of the component and the rotational speed of the component can be calculated through the interaction of a sensor device with a single common encoder contour of the component. For calculating the rotational speed of the component, upon a rotation of the component, use is made in particular of the effect that the transition from a first area to a second area of the encoder contour directly bordering the first area in the circumferential direction of the component through the slopes in the axial direction of the component differing from each other is detectable in a simple manner by a sensor device, and that rotational speed information can be extracted in a simple manner through a corresponding evaluation of a chronological progression of the respective transitions and/or breaks in the air gaps between the first and second areas. The axial position of the component is possible in a simple manner through a sensor device through the interaction with the first areas of the encoder contour, whereas the slope, varying in an axial direction, of the radial extension of the surface of the first areas is thereby used.

The encoder contour is preferably located on a side of the component turned away from the central axis, but, for a component designed as a hollow shaft, may be arranged on a side of the component turned towards the central axis.

With an advantageous version of the component in accordance with the invention, the surface of the first areas in the axial direction of the component is designed with two adjacent sections, whereas a radial extension of the surface of the first areas in the first section features, viewed in the axial direction of the component, a monotonically increasing slope, (i.e. constant slope towards the central axis) and a radial extension of the surface of the first areas in the second section features, viewed in the axial direction of the component, a monotonically decreasing slope, (i.e. constant slope away from the central axis) or vice versa.

In particular, if the encoder contour in the first areas is designed essentially as a mirror image to a plane perpendicular to the central axis of the component and running through the adjacent area of the two sections, an axial position of the component can be determined by the sensor device in a particularly simple manner. Thereby, the surface of the first areas features in particular a V-shaped cross section, whereas, in the adjacent area of the two sections, a radial extension of the surface of the first areas may feature a maximum or a minimum value.

For the calculation of the axial position of the component, it can be advantageous if the first section and second section, in each case in one area repelling and in one area connected with each other, of a radial extension of the central axis, is essentially constant over a small axial extension of the component, and a shoulder area of the encoder contour is thereby formed in each case.

For the calculation of the rotational speed of the component, in particular in combination with a surface of the first areas featuring a V-shaped cross section, it is particularly advantageous if the surface of the second areas in the axial direction of the component features an extension that is essentially constantly radial in respect of the central axis of the component, and is preferably curved in the area of the second area in the circumferential direction of the component or designed to be flat. With such a design of the encoder contour, both the axial position of the component and the rotational speed of the component can be calculated by a sensor device in a simple manner.

With an advantageous version of a component in accordance with the invention, the surface of the second areas features, at least approximately, through an overall extension of the encoder contour in the axial direction of the component, a radial extension in respect of the central axis, which corresponds to a radial extension of the surface of the first areas in the area of a minimum or maximum radial extension in respect of the central axis of the component. With such a version of the encoder contour, both the rotational speed of the component and the axial position of the component can be calculated with great reliability.

The encoder contour is producible in a simple manner if the encoder contour is initially designed with a fully revolving first area, and the second areas, depending on the configuration of the first area, are introduced as grooves of the first area, or the second areas are formed as elements inserted into the first area.

The rotational speed of the component can be calculated in a particularly simple manner if, in particular, all second areas of the encoder contour are essentially designed with identical construction, whereas each gap between adjacent second areas in the circumferential direction of the component is essentially constant.

Furthermore, a device with a rotatably mounted component in accordance with the invention that is displaceable in an axial direction and a sensor device, with which a gap between a surface of the encoder contour and of the sensor device can be calculated, are proposed.

With such device, both the axial position of the component and the rotational speed of the component can be calculated in a particularly simple manner, whereas the sensor device only interacts with the single revolving encoder contour, such that, for the calculation of the axial position of the component and the calculation of the rotational speed of the component, only a small amount of installation space, running in an axial direction, is required for the component. Through the first and second areas of the encoder contour alternately provided in the circumferential direction of the component and adjacent to each other, and the slopes, differentiated from each other in respect of their axial direction of the component, of the radial extension of the surface of the respective areas in respect of the central axis of the component, upon a rotation of the component, the gap between the sensor device and the encoder contour is changed, whereas a rotational speed of the component can be calculated in a simple manner through a sequence of changes to the gap. An axial position of the component is also able to be calculated in a simple manner through the radial extension of the surface varying in the first areas in the axial direction of the component, such that both the axial position of the component and the rotational speed of the component are able to be determined through the interaction of the sensor device with the component.

With an advantageous version of the device in accordance with the invention, the sensor device features at least one sensor unit that, for the calculation of the gap between the surface of the encoder contour and the sensor unit, is designed with a permanent magnet and at least one measuring device. Through the measuring device, which is designed specifically as a Hall cell, a deflection of the magnetic field lines of the permanent magnet is detectable through the first or second area of the encoder contour of the component, which interacts with the sensor unit. An evaluation device is provided by means of which the position of the component in an axial direction can be calculated from the measuring signals generated by the measuring devices. The evaluation device is in particular a part of the sensor device, but also may be, for example, a part of an electronic transmission control unit.

With an advantageous version of the invention, the sensor unit has two measuring devices, which are arranged in a manner spaced apart from each other in the axial direction of the component, whereas, by means of each measuring device, a gap between an area of the sensor unit featuring the respective measuring device and the encoder contour of the component can be calculated. With such a design of the sensor unit, both the axial position of the component and the rotational speed of the component can be calculated precisely and reliably, if the evaluation device is designed for the formation of a sensor signal from a difference or an average value from the measuring signals generated by the measuring devices or for the evaluation of such sensor signal(s).

A cost-effectively producible device is created if the sensor device features a single sensor unit interacting with the encoder contour, which is provided to calculate the position of the component in an axial direction and to calculate the rotational speed of the component. However, as an alternative to this, it can also be provided that the sensor device features a sensor unit interacting with the encoder contour for calculating the position of the component in an axial direction and a sensor unit interacting with the encoder contour for calculating the rotational speed of the component, whereas the sensor units are particularly arranged in a manner spaced apart from each other in the circumferential direction of the component.

With an advantageous version of the invention, the sensor device features at least one filter device, which is designed for the transformation of a sensor signal fed to the filter device into a first useful signal provided for calculating the axial position of the component and/or a second useful signal provided for calculating the rotational speed of the component. Through the filter device, interferences that arise, for example, through a change in load of the component and/or mechanical tolerances and vibrations in the area of the component, may be hidden or eliminated from the sensor signal. The filter device is designed in particular in such a manner that areas of the sensor signal that are generated through the interaction of the sensor unit with the first areas or second areas, as the case may be, and constitute interferences for the second useful signal or the first useful signal, as the case may be, can be filtered out.

The filter device may be designed to be both analog and digital, and may be formed in particular for carrying out a high-pass filtering, low-pass filtering, a band-pass filtering and/or a band blocking filtering. Furthermore, the filter device may be provided for passive or active filtering. The filter device may be designed for calculating the axial position of the component, in particular for carrying out a passive low-pass filtering or an actively maintained band block, and for calculating the rotational speed of the component, in particular for carrying out a passive high-pass filtering and/or an actively maintained band-pass filtering.

With a version of the device that is particularly favorable for installation space, the sensor device features at least one microcontroller, which is designed in particular with at least one digitally designed filter device and at least one measuring device.

A method for calculating the axial position and the rotational speed of a rotatably mounted component that is adjustable in an axial direction, in particular a shifting element of a transmission device, is further proposed, whereas a first sensor signal is generated from the interaction of a sensor device with an encoder contour of a first sensor signal revolving on the circumference of the component. This signal is transformed by a filter device into a first useful signal, on the basis of which the axial position of the component can be calculated. It is thereby provided that, through the interaction of the sensor device with the encoder contour, a second sensor signal is generated, which is transformed by an additional filter device into a second useful signal, on the basis of which the rotational speed of the component can be calculated.

With the method in accordance with the invention, in addition to a calculation of the axial position of the component, the rotational speed of the component can also be calculated in a simple manner, whereas only a common encoder contour of the component is required for this. Thus, for calculating the axial position and for calculating the rotational speed of the component, the required installation space of the component in an axial direction is very low. Thereby, the first sensor signal and the second sensor signal may be identical, whereas, through a first filtering, the first useful signal, and, through a second filtering, the second useful signal, can be calculated from the common sensor signal. As an alternative to this, two different sensor signals can be used for calculating the axial position of the component and for calculating the rotational speed of the component.

With an advantageous version of the method in accordance with the invention, the first sensor signal is generated by the interaction of a first sensor unit of the sensor device with the encoder contour, and the second sensor signal is generated by the interaction of a second sensor unit of the sensor device with the encoder contour. Thereby, the respective sensor unit can be specified for the respective functionality.

As an alternative to this, the first sensor signal and the second sensor signal are generated through the interaction of a single sensor unit of the sensor device with the encoder contour, whereas this can save costs and installation space compared to the use of two sensor units.

If the sensor unit features two measuring devices arranged in a manner spaced apart from each other in the axial direction of the component, with which a measuring signal reproducing a gap between an area of the sensor unit featuring the respective measuring device and the encoder contour is calculated, whereas the first sensor signal and/or the second sensor signal for calculating the axial position and/or the rotational speed of the component is formed by a difference of the measuring signals of the measuring devices, the rotational speed of the component and in particular the axial position of the component can be calculated with particular precision in a simple manner. The rotational speed of the component may be calculated in particular from cyclical breaks in the gap, detectable by the sensor unit, which arise during a rotation of the component, between the sensor unit and the encoder contour.

Advantageously, the rotational speed of the component can be calculated particularly independent of external interferences and the position of the component in an axial direction, if the sensor unit features two measuring devices arranged in a manner spaced apart from each other in the axial direction of the component, with which a measuring signal reproducing a gap between the sensor unit and the encoder contour is calculated, whereas the second sensor signal for calculating the rotational speed of the component is formed by an average value of the measuring signals of the measuring devices.

With an advantageous version of the method in accordance with the invention, it is provided that, for the transformation of the first sensor signal into the first useful signal, a filtering of the first sensor signal is carried out with a passive low-pass filter or an actively maintained band stop filter or a band block. Thereby, in a simple manner, interferences caused in particular by areas of the encoder contour provided for the calculation of the rotational speed or by a transmission device featuring the component during operation can be eliminated from the first sensor signal, and the axial position of the component can be calculated precisely and reliably in a simple manner.

With an advantageous version of the method in accordance with the invention, the rotational speed of the component can be calculated very precisely in a simple manner, if, for the transformation of the second sensor signal into the second useful signal, a filtering of the second sensor signal with a high-pass or an actively maintained band-pass is carried out. Thereby, interferences of the second sensor signal, which are caused in particular by areas of the encoder contour provided for the calculation of the axial position of the component or by external interferences, can be filtered out of the second sensor signal in a simple manner, whereby the second useful signal can be calculated thereby.

Both the characteristics specified in the claims and the characteristics specified in the subsequent embodiments of the component in accordance with the invention, the device in accordance with the invention and the method in accordance with the invention are, by themselves alone or in any combination with one another, suitable for providing additional forms for the object in accordance with the invention. In terms of the additional forms of the object in accordance with the invention, the particular combinations of characteristics do not represent a limitation; rather, they are essentially solely of an exemplary nature.

BRIEF DESCRIPTION OF THE DRAWINGS

Additional advantages and advantageous embodiments of the component in accordance with the invention, the device in accordance with the invention, and the method in accordance with the invention arise from the claims and the embodiments described below, with reference to the drawings in terms of principle, whereas, for the sake of clarity, in the description of the various embodiments, the same reference signs are used for structurally and functionally equivalent components.
The following is shown:

DETAILED DESCRIPTION

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

Figure 1:
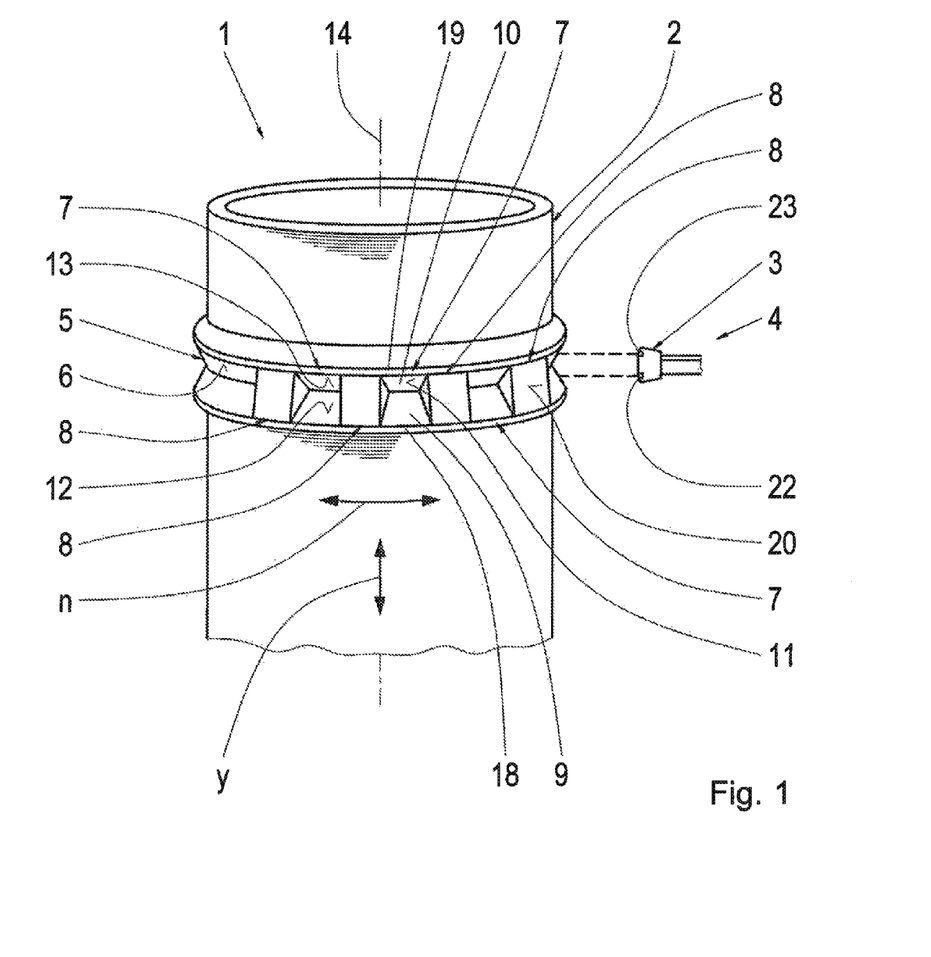
FIG. 1 a highly simplified three-dimensional view of a device in accordance with the invention with a shifting element designed as a hollow shaft, which is designed with an encoder contour revolving in a circumferential direction, and a sensor device featuring a sensor unit, which is provided for calculating the axial position and the rotational speed of the shifting element.

FIG. 1 shows a highly simplistic view of a device 1 with a component 2 rotatable in the circumferential direction n and adjustable in the axial direction y and a sensor device 4 featuring a sensor unit 3. Here, the component 2 is designed as a hollow shaft, and represents a shifting element of a transmission device, which is displaceable in the axial direction y between a first end position, in which, for example, the shifting element 2 forming a claw is rotatably mounted in respect of a shaft of the transmission device that is not shown in more detail, and a second end position, in which the shifting element 2 is connected in a torque-proof manner to the shaft of the transmission device.

If a shift request is indicated by an electronic transmission control unit 21 (FIG. 2), for example, because of increasing rotational speeds, and the shifting element 2 is to be displaced between the first end position and the second end position, in addition to knowledge of a transfer turning moment, in particular the knowledge of the differential rotational speed between the shifting element 2 and the shaft is necessary in order to successfully carry out the shifting process. In order to determine whether, after a requested displacement movement, the shifting element 2 has reached the desired end position or whether a malfunction is present, it is also necessary to calculate the current axial position of the shifting element 2.

In order to calculate the rotational speed of the shifting element 2 and the axial position of the shifting element 2, the sensor unit 3 interacts with an encoder contour 5 fully revolving with the shifting element 2 in a circumferential direction, whereas, with the sensor unit 3, a gap between the sensor unit 3 and a surface 6 of the encoder contour 5 can be calculated.

For this purpose, the encoder contour 5 features alternating first areas 7 and second areas 8 in a circumferential direction n, whereas, in the present case, all first areas 7 are designed with identical construction and feature an essentially identical extension in the circumferential direction n of the shifting element 2. Here, all second areas 8 are likewise designed with identical construction and feature an essentially identical extension in the circumferential direction n of the shifting element 2.

Figure 2:
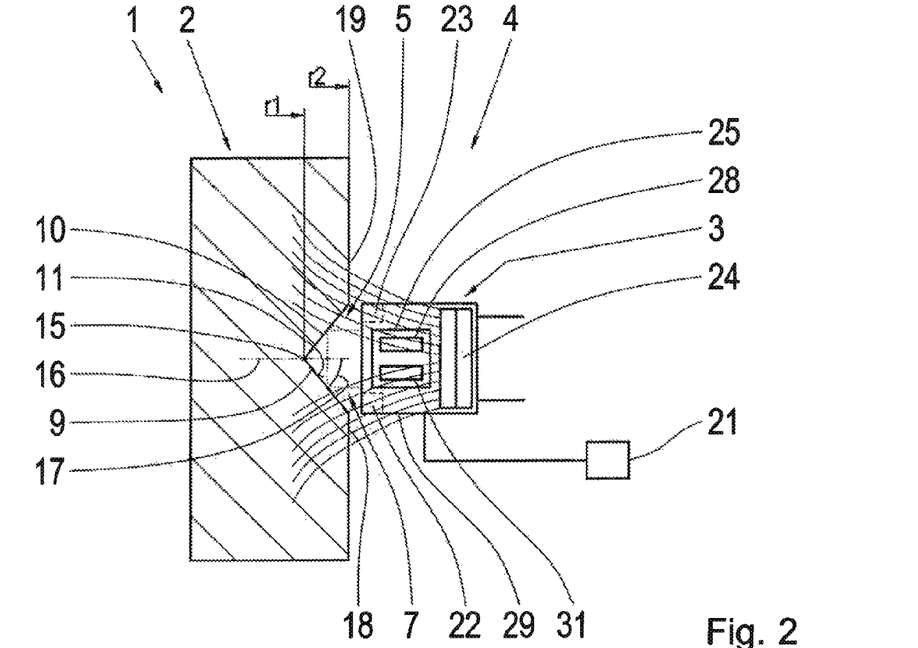
FIG. 2 a highly simplified section view of a cut-out of the encoder contour of the shifting element of FIG. 1 in the longitudinal direction of the shifting element and the sensor unit, whereas the interaction of the sensor unit with a first area of the encoder contour is shown in more detail.

The first areas 7 are, as shown in a longitudinal view in FIG. 2, viewed in an axial direction y of the shifting element 2, designed with two adjacent sections 9, 10. A radial extension of a surface 11 of the first areas 11 turned away from the central axis 14 of the shifting element 2 features, in a first section 9, viewed in an axial direction y of the shifting element 2, a monotonically decreasing slope. In contrast to this, a slope of a radial extension of the surface 11 of the first areas 7 is monotonically increasing in a second section 10. In their adjacent areas, the sections 9, 10 forms, in each case, a surface 12, 13 curved in a circumferential direction, whereas the surfaces 12, 13 are arranged essentially as mirror images to a plane 16 arranged perpendicular to a central axis 14 of the shifting element 2 and running through an intersection point 15 of the sections 9, 10, and feature in respect of the plane 16 an angle 17 of approximately 45° here. On an end area opposite each other, both the first section 9 and the second section 10 feature a shoulder area 18, 19 with an essentially constant radial extension in respect of the central axis 14 or with a constant radial gap of the central axis 14 of the shifting element 2.

Figure 3:
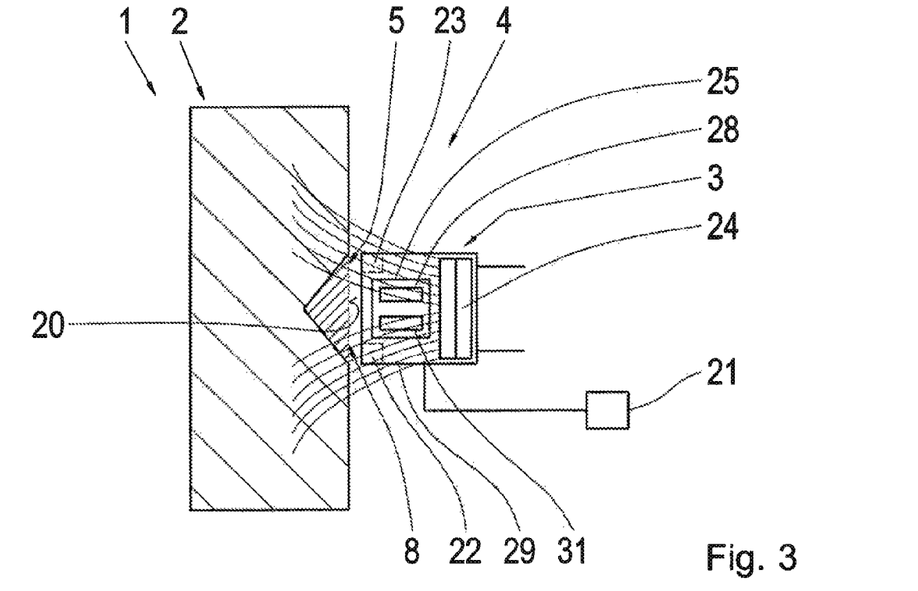
FIG. 3 a highly simplified section view of the encoder contour of the shifting element of FIG. 1 in the longitudinal direction of the shifting element, whereas the interaction of the sensor unit with a second area of the encoder contour is shown in more detail.

In FIG. 3, a longitudinal view of a second area 8 of the encoder contour 5 is shown in more detail. Here, a surface 20 of the second area 8 turned towards the sensor unit 3 and turned away from the central axis 14 of the shifting element 2 features, through an overall axial extension of the encoder contour 5, a radial extension in respect of the central axis 14 of the shifting element 2, which essentially corresponds to a radial extension of the first areas 7 in the respective shoulder areas 18, 19 in respect of the central axis 14 of the shifting element 2. Here, the surface 20 of the second area 8 is curved in the circumferential direction n of the shifting element 2 and essentially arranged concentric to the central axis 14 of the shifting element 2.

In the present case, the sensor unit 3 is mounted in a fixed location in the area of the transmission device, whereas, with the sensor unit 3, a gap between the sensor unit 3 and the surface 6 of the encoder contour 5 can be calculated. In the present case, for this purpose, the sensor unit 3 features two measuring devices 22, 23 arranged in a manner spaced apart from each other in the axial direction y of the shifting element 2 and a back-biased permanent magnet 24, which is arranged on a side of the measuring devices 22, 23 turned away from shifting element 2. Through the interaction of the measuring devices 22, 23, which are in particular designed as so-called "Hall cells," with an evaluation device 25 of the sensor unit 3, a gap between an area of the sensor unit 3, in particular a surface of the sensor unit 3 in the area of the respective measuring device 22 or 23, featuring a respective measuring device 22 or 23, and the surface 6 of the encoder contour 5 turned towards the sensor unit 3 can be calculated. For this purpose, the measuring devices 22, 23 measure a deflection of field lines of the permanent magnet 24 through the area 7 or 8 of the encoder contour 5 currently interacting with the sensor unit 3, and issue an electrical measuring signal.

Figure 4:
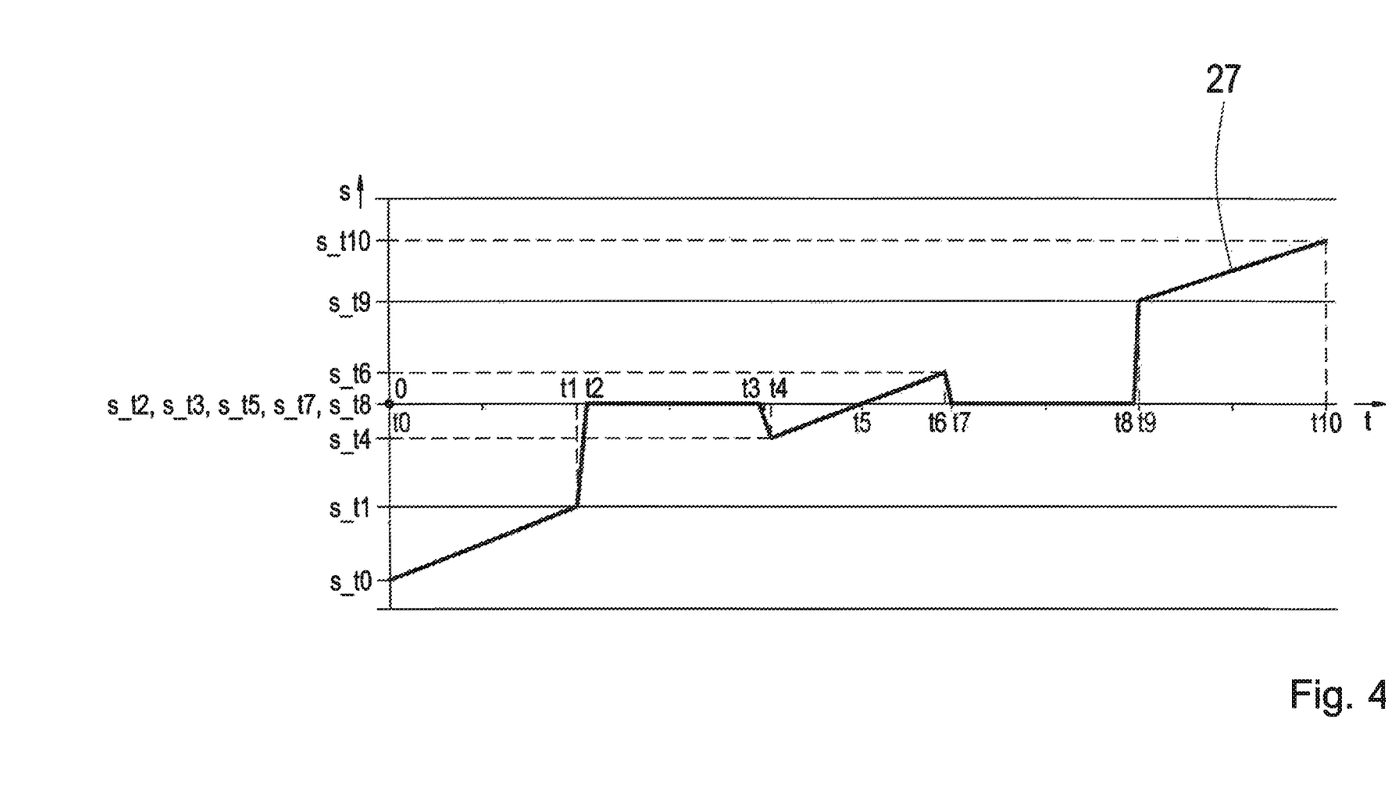
FIG. 4 a simplified view of a curve of a sensor signal calculated by the sensor unit during the rotation and displacement of the shifting element in an axial direction.

Based on the measuring signals calculated by the measuring devices 22, 23 and containing gap information, in the present case, a sensor signal 27 is generated in the area of the evaluation device 25. This sensor signal is formed by a difference of the measuring signals calculated and, if applicable, reinforced by the measuring devices 22, 23. FIG. 4 shows an exemplary slope of the sensor signal 27 during a displacement movement of the shifting element 2, with constant speed, between its first end position and its second end position, and the simultaneous rotation of the shifting element 2 in a circumferential direction n with constant speed. Thereby, for the sake of clarity, the curve of the sensor signal 27 in FIG. 4 is shown in idealized form, i.e., without external interferences, which arise, for example, from changes in load in the area of the transmission device from mechanical tolerances in the area of the shifting element 2 or from vibrations of the shifting element 2.

In the first end position of the shifting element 2, the sensor unit 3 in the example shown initially interacts with a first section 7 of the encoder contour 5. Thereby, the first measuring device 22 is arranged in an axial direction y in the shoulder area 18 of the first section 9, and the second measuring device 23 is arranged in the area of the plane 16 and thus in the area of the lowest radial extension of the first area 7 in respect of the central axis 14. Thus, the gap value calculated by the first measuring device 22 is minimal, and the gap value calculated by the second measuring device 23 features a maximum value. Therefore, a differential value s of the sensor signal 27, formed by a difference of the gap value calculated by means of the first measuring device 22 and the gap value calculated by means of the second measuring device 23, takes on, by definition, a negative maximum value s_t0 at the point in time t0. On the basis of an adjusting movement of the shifting element 2 in the direction of its second end position, the first measuring device 22 increasingly interacts with the monotonically decreasing area of the first section 9, and the second measuring device 23 increasingly interacts with the monotonically increasing area of the second section 10, which is why a differential value s_t1 arises from the difference of the gap value calculated by the first measuring device 22 and the gap value calculated by the second measuring device 23 increases until the point in time t1, essentially with a constant slope.

Through the rotation of the shifting element 2 around the central axis 14, at the point in time t2, the encoder contour 5 takes a position in respect of the sensor unit 3 at which the measuring devices 22, 23 then measure a gap at the surface 20 of a second area 8 of the encoder contour 5. Since the gap measured by the first measuring device 22 and the gap measured by the second measuring device 23 are thereby essentially identical, the differential value s_t2 takes a value equal to zero. Until the point in time t3, the differential value s_t3 remains essentially constant, since the measuring devices 22, 23 interact with the second area 8 until the point in time t3. From the point in time t4, the measuring devices 22, 23 in turn interact with a first area 7 adjacent to the second area 8. The differential value s_t4 at the point in time t4 is enlarged compared to the differential value s_t1 at the point in time t1, since the shifting element 2 is further moved in the direction of its second end position between the points in time t1 and t4, and the gap values calculated by means of the measuring devices 22, 23 are changed in an analog manner at the points in time t0 to t1.

Starting from the point in time t4, the differential value s_t4 continues to increase up to the differential value s_t5 at the point in time t5, at which the first measuring device 22 and the second measuring device 23 is equidistant in an axial direction y from the plane 16, which in turn is equal to zero. From the point in time t5, the gap value measured by the measuring device 22 further increases up to the point in time t6, whereas the gap value measured by the second measuring device 23 is smaller, such that the differential value s_t6 continues to increase up to the point in time t6.

In turn, at the point in time t7, a second area 8 of the encoder contour 5 takes a position interacting with the measuring devices 22, 23 in a circumferential direction n, such that the differential value s_t7 at the point in time t7 and the differential value s_t8 at a point in time t8 are constantly equal to zero in a manner described in more detail above. After this second area 8 is further rotated in a circumferential direction n so far that the measuring devices 22, 23 in turn interact with a first area 7 of the encoder contour 5 following the second area 8, and a gap is measured between the respective device 22, 23 and the surface 11 of the first area 7, the differential value s_t9 continues to increase starting from the point in time t9, until the shifting element 2 is fully displaced into the second end position.

With a shifting element 2 found in its second end position, the first measuring device 22 is arranged in the axial direction y in the area of the plane 16 and the second measuring device 23 in the shoulder area 19 of the second section 10. The differential value s_t10 arising from the gap value measured by the first measuring device 22 and the gap value measured by the second measuring device 23 is at a maximum at the point in time t10, and, in the present case, corresponds to the amount of the differential value s_t0.

In order to derive an axial position of the shifting element 2 from the slope shown in FIG. 4, the evaluation device 25 of the sensor unit 3 features a filter device 28, designed here as a digital filter, which, in the present case, just like the measuring devices 23, 23, is formed integrally with a microprocessor or a microcontroller 29 of the sensor unit 3. The measuring signals or raw signals in the form of electrical signals, measured by the measuring devices 22, 23, are fed through pins to the microcontroller 29, and subsequently evaluated by the evaluation device 25 by means of the filter device 28.

Figure 5:
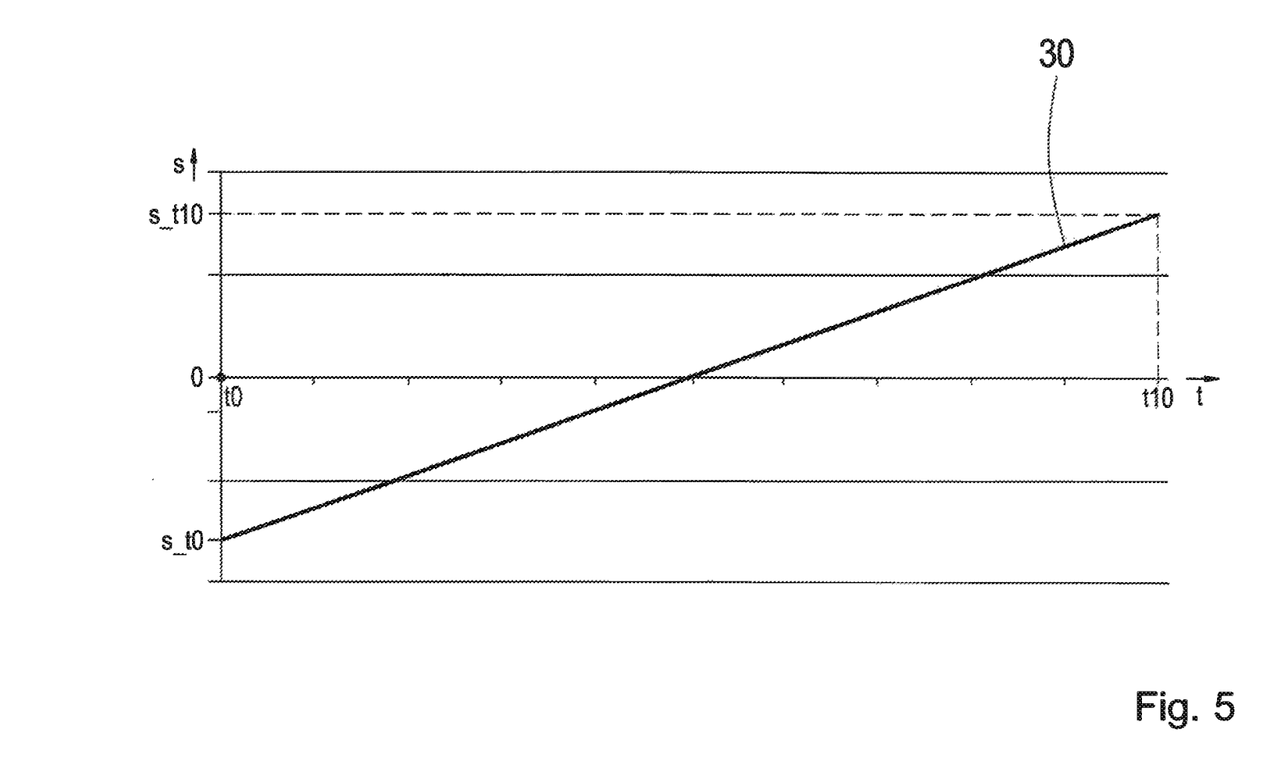
FIG. 5 a simplified view of a first useful signal, which is calculated through a low-pass filtering of the sensor signal of FIG. 4.

In the present case, through the filter device 28 of the evaluation device 25, the sensor signal 27 consisting of measuring signals from the differential values s calculated by the measuring devices 22, 23 is subject to a passive low-pass filtering, whereas the useful signal shown in FIG. 5, by means of which the axial position of the shifting element 2 can be calculated at the point in time t, arises from this.

In addition to a design as a passive low-pass filter, it may be also provided that an actively maintained band blocking filtering through the filter device 28 is feasible. This may be particularly advantageous if, for example, disruptions caused by external stresses strongly influence the sensor signal 27, and a sufficient quality of the useful signal 30 is not achievable with a passive low-pass filtering.

In the present case, the evaluation device 25 or signal conditioning unit and signal processing unit feature, in addition to the filter device 28, an additional filter device 31, which is also designed integrally with the microcontroller 29, and is provided for the calculation of the rotational speed of the shifting element 2. For this purpose, with an alternating interaction of the measuring devices 22, 23, the short-term, sudden and cyclical deviations in the gap values calculated by the measuring devices 22, 23 are exploited with a first area 7 and a second area 8 of the encoder contour 5.

Figure 6:
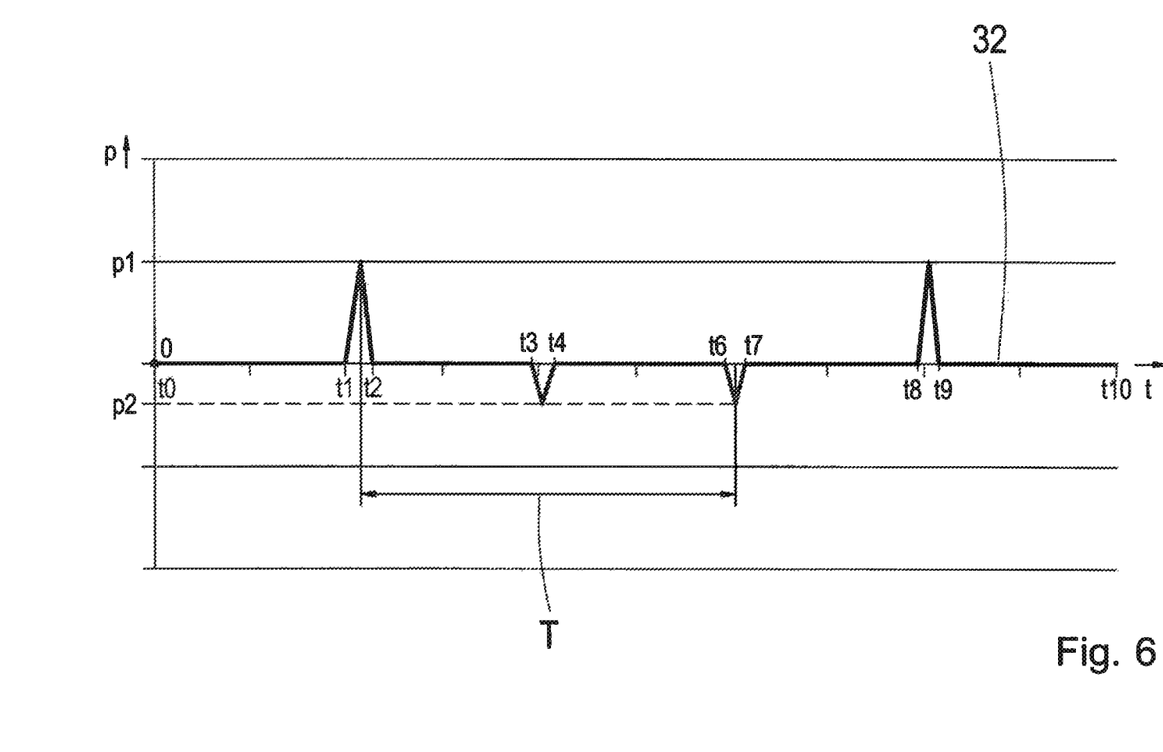
FIG. 6 a simplified view of a second useful signal, which is calculated through a high-pass filtering of the sensor signal of FIG. 4.

In the present case, the additional filter device 31 is likewise fed the sensor signal 27, whereas the additional filter device 31 is designed for the purpose of generating, from the sensor signal 27, the useful signal 32 shown in FIG. 6. Here, the second useful signal 32 is obtained through a passive high-pass filtering of the sensor signal 27, and reproduces impulses p of the sensor signal 27 that arise during a lapse of time. Through the large increases in the sensor signal 27 between the points in time t1 and t2, t3 and t4, t6 and t7, and t8 and t9, the second useful signal 32, which arises in particular through a derivation of the sensor signal 27, features pinnacles or peaks with impulse values p1 or p2 between the respective points in time t1 and t2, t3 and t4, t6 and t7, and t8 and t9. A rotational speed of the shifting element 2 is calculated by the evaluation device 25 by the fact that a reciprocal value of a gap in time T is determined from one peak to the next peak plus one, for example from one peak between the points in time t1 and t2 and one peak between the points in time t6 and t7.

However, the calculation of the rotational speed of the sensor signal 27 has the disadvantage that, in the example shown, the sensor signal 27 features only slight differential values s between the points in time t2 and t8, such that the peaks p2 of the second useful signal 32 are relatively small between the points in time t3 and t4 and t6 and t7. During this range of time in particular, external interferences can have a relatively large influence on the second useful signal 32, such that the calculation of the rotational speed of the shifting element 2 can be prone to error in this range of time. In order to counteract this problem, instead of the passive high-pass filtering, an actively maintained band-pass filtering may be carried out, through which, upon the conversion of the sensor signal 27 into the useful signal 32, the external interferences can be filtered out with particular effectiveness.

Figure 7:
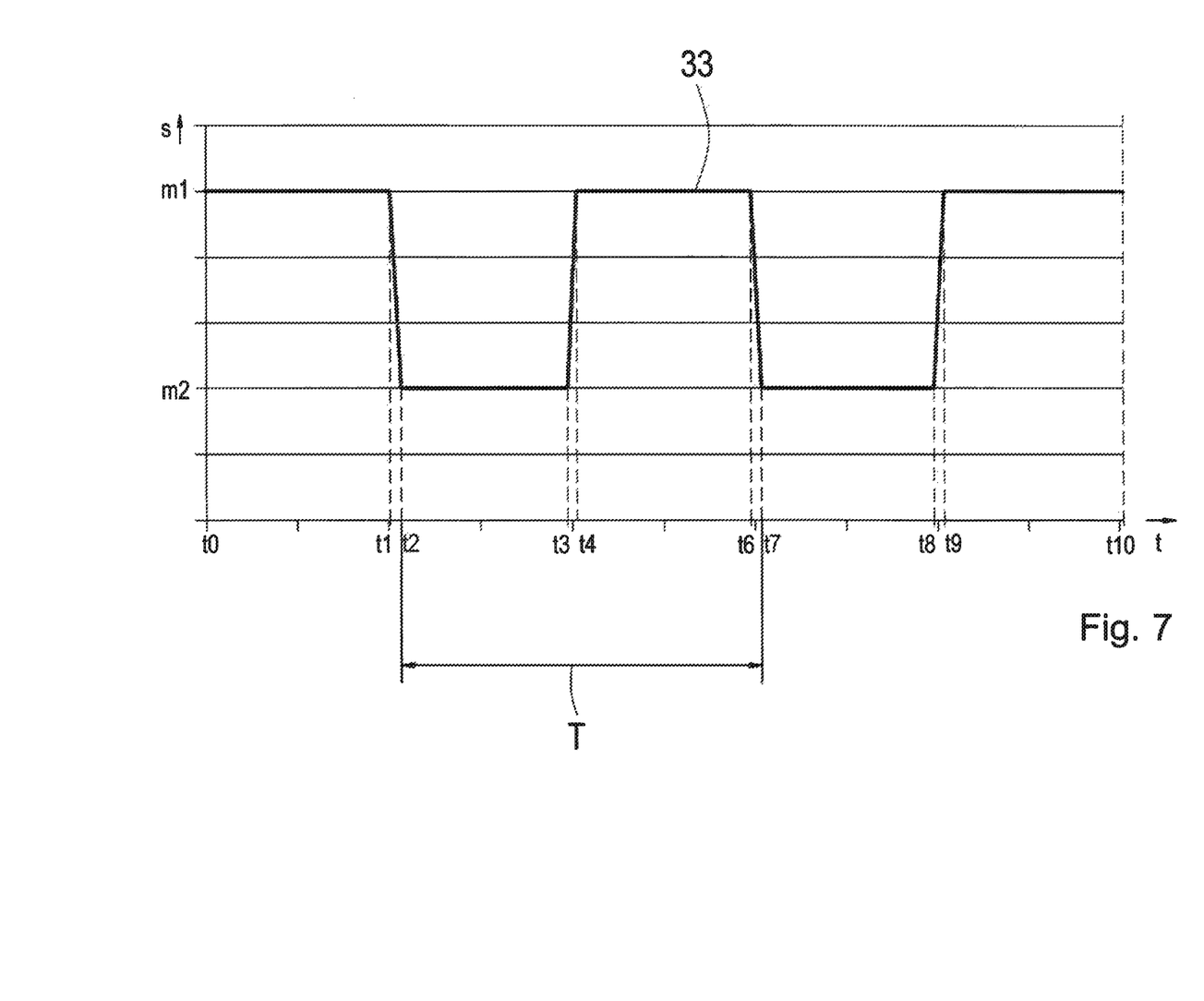
FIG. 7 a simplified view of a curve of the additional sensor signal calculated by the sensor unit during a rotation and displacement of the shifting element in an axial direction.

A very error-resistant calculation of the rotational speed can be achieved if, based on the measuring signals of the measuring devices 22, 23, instead of the sensor signal 27, an additional sensor signal 33 is generated, which is formed by the arithmetic average value of the measuring signals calculated by the measuring devices 22, 23. FIG. 7 shows an exemplary slope of the additional sensor signal 33, whereas the additional sensor signal 33 is based on the same measuring signals of the measuring devices 22, 23 as the sensor signal 27.

FIG. 7 shows that the additional sensor signal 33 features, both in the time intervals formed by the points in time t0 and t1, t4, and t6, t9 and t10, in which, through the measuring devices 22, 23, a gap between an area of the sensor unit 3 featuring the measuring devices 22, 23 and a surface 11 of a first area 7 of the encoder contour 5 is calculated, a constant first average value m1, and in the time intervals formed by the points in time t2 and t3, t7 and t8, in which, through the measuring devices 22, 23, a gap between an area of the sensor unit 3 featuring the measuring devices 22, 23 and a surface 20 of a second area 8 of the encoder contour 5 is calculated, a second constant average value m2.

Therefore, in the present case, upon an interaction of the sensor unit 3 with a first section 7 of the encoder contour 5, the average value m1 is constant, since, upon an axial displacement of the shifting element 2, independent of the axial position of the shifting element 2, given the mirror-image design of the first section 9 and the second section 10 with the plane 16, the gap values that are able to be calculated by the first measuring device 22 increase or decrease in the same measure as the gap values that are able to be calculated by the second measuring device 23 decrease or increase. However, with the measuring devices 22, 23 interacting with a second area 8 of the encoder contour 5, the gap values calculated by the measuring devices 22, 23 are essentially identical to, and in the example shown, smaller than, the gap values with the sensor unit 3 interacting with a first area 7 of the encode contour 5, such that the constant curve of the average values m2 between the points in time t2 and t4 and t7 and t8 arises from this.

Figure 8:
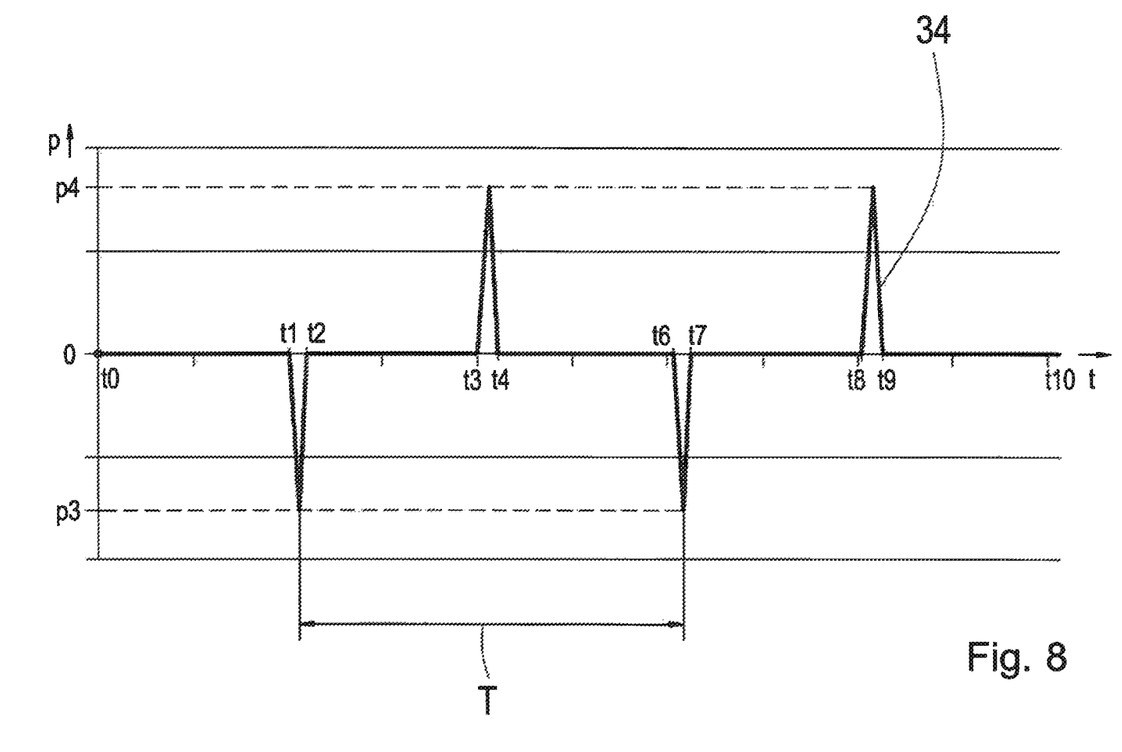
FIG. 8 a simplified view of an additional signal, which is calculated by a high-pass filtering from the additional sensor signal of FIG. 7.

In the present case, through a filtering of the additional sensor signal 33 with the additional filter device 31, an additional useful signal 34 (shown in FIG. 8) is generated from the additional sensor signal 33 through a high-pass filtering. In the present case, the difference in the average values between the points in time t1 and t2, t3 and t4, t6 and t7 and t8 and t9, which represent a transition of the interaction of the sensor unit 3 from a first area 7 to a second area 8 or vice versa, is constant during an overall adjusting movement of the shifting element 2 between the first end position and the second end position. In the present case, such constant difference is determined from one half of a difference of a maximum radial extension r2 in respect of the central axis 14 and a minimal radial extension r1 in respect of the central axis 14 of a first area 7 of the encoder contour 5. Based on the large differential values, the additional useful signal 34 between the points in time t1 and t2, t3 and t4, t6 and t7, and t8 and t9 features peaks with the values p3 and p4, whereas, in the present case, the sum of the values p3 and p4 is essentially equally large. Thereby, even with larger external interferences, the rotational speed of the shifting element 2 is very error-resistant as a whole, and can be calculated in a manner analog to the useful signal 31 arising from the additional useful signal 34.

With the sensor device 3 that is shown, the calculation of the rotational speed and the determination of the axial position of the shifting element 2 are carried out in parallel to each other, whereas, in each case, the rotational speed and the axial position of the shifting element 2 that are calculated are fed to the electronic transmission control unit 21. Based on the information that is fed to it, the transmission control unit 21 can then check whether the shifting element 2 has been transferred between the first end position and the second end position, for example after an initiated displacement movement of the shifting element 2, and whether the displacement movement has been successful, or corrections are necessary.

In addition to the version shown with an evaluation device 25 with two filter devices 28, 31, with an alternative version of the invention, two evaluation devices with one filter device each can also be provided, whereas measuring signals of the measuring devices can be fed to each evaluation device. Further, in addition to the arrangement in the area of the sensor unit 3, the evaluation device 25 may also be arranged in the area of the electronic transmission control unit 21. The measuring signals must then be carried over long distances, may be subject to additional interferences and, if necessary, must be reinforced. In addition to calculating the gap values between the sensor unit 3 and the encoder contour 5 of the shifting element 2, the sensor unit 3 may also be designed to record the temperature in the area of the encode contour 5 of the shifting element 2.

Modifications and variations can be made to the embodiments illustrated or described herein without departing from the scope and spirit of the invention as set forth in the appended claims.

The invention claimed is:

1. A component of a transmission that is rotatable relative to a central axis and is adjustable in an axial direction, comprising: a contour defined in a circumference of the component so as to rotate with the component, the contour designed to interact with a sensor device spaced radially adjacent to the contour; the contour comprising a plurality of first areas used by the sensor device to calculate a position of the component in the axial direction, each of the first areas comprising a first surface that varies in a radial dimension relative to the central axis along the axial direction; the contour further comprising a plurality of second areas used by the sensor device to calculate a rotational speed of the component, each of the second areas comprising a second surface with a slope in the axial direction that is differentiated by the sensor device from a slope of the first surface in the first areas, each of the second areas having a same constant radius along the axial direction of movement of the component; and the first areas and second areas alternating around the circumference of the component such that the first areas are flanked by immediately adjacent second areas without a circumferential space between the first areas and the second areas.

2. The component as in claim 1, wherein the first surface of the first areas comprises two sections adjacent each other in the axial direction, wherein along the axial direction of movement of the component, one of the sections having a constant slope towards the central axis, and the other section having a constant slope away from the central axis.

3. The component as in claim 2, wherein the radius of the second surfaces of the second areas corresponds to either of a maximum or a minimum radius of the two section of the first surface.

4. The component as in claim 1, wherein a circumferential spacing of the second areas around the contour is constant.

5. A transmission device, comprising: a component that is rotatable relative to a central axis and is adjustable in an axial direction, the component further comprising: a contour defined in a circumference of the component so as to rotate with the component; the contour comprising a plurality of first areas used by a sensor device to calculate a position of the component in the axial direction, each of the first areas comprising a first surface that varies in a radial dimension relative to the central axis along the axial direction; the contour further comprising a plurality of second areas used by the sensor device to calculate a rotational speed of the component, each of the second areas comprising a second surface with a slope in the axial direction that is differentiated by the sensor device from a slope of the first surface in the first areas; and the first areas and second areas alternating around the circumference of the component; the sensor device spaced radially adjacent the contour, the sensor device interacting with the contour to determine a gap distance from the sensor device to surfaces of the first areas and second areas, wherein one or both of an axial position of the component or rotational speed of the component is calculated based on the gap distances; the sensor device comprising at least one sensor unit with two measuring devices spaced apart in the direction of axial movement of the component and oriented relative to the first and second areas such that the measuring devices simultaneously determine the gap distance at axially spaced locations within a single one of the first areas that is opposite to the sensor device and sequentially determine the gap distance to a single one of the second areas that is opposite to the sensor device as the component rotates.

6. The device as in claim 5, wherein the sensor device comprises a single sensor unit for determining axial position of the component and rotational speed of the component from a single signal produced by the single sensor unit.

7. The device as in claim 5, wherein the sensor device comprises a first sensor unit for determining axial position of the component from a signal produced by the first sensor unit and a separate second sensor unit for determining rotational speed of the component from a signal produced by the second sensor unit.

8. The device as in claim 5, wherein the sensor device comprises a filter configured to transform a sensor signal from the measuring device into one or both of a first signal used to calculate the axial position of the component or a second signal used to calculate rotational speed of the component.

9. The device as in claim 8, wherein the sensor device comprises a microcontroller that includes the filter and the measuring device.

10. A method for calculating the axial position and rotational speed of a component in a transmission, wherein the component is rotatable and axially shiftable between operating positions, comprising: generating a first sensor signal by interaction of a sensor device with first areas of an encoder contour provided around a circumference of the component the first areas varying in a radial dimension relative to a central axis of the component along the axial direction; transforming the first sensor signal with a filter into a first signal; using the first signal to calculate the axial position of the component; generating a second sensor signal by interaction of the sensor device with second areas of the encoder contour, the second areas having a constant radial dimension relative to the central axis of the component; transforming the second sensor signal with a filter into a second signal; using the second signal to calculate rotational speed of the component; wherein the sensor device has a sensor unit with to measuring device spaced apart in the direction of axial movement of the component the first sensor signal generated as a function of a difference in signals from the two measuring devices for the first areas of the contour, and the second sensor signal generated as a function of an average of the signals from the two measuring devices for the second areas of the contour.

11. The method as in claim 10, wherein the first sensor signal is generated by interaction of a first sensor unit of the sensor device with the encoder contour, and the second sensor signal is generated by interaction of a second sensor unit of the sensor device with the encoder contour.

12. The method as in claim 10, wherein the first sensor signal is generated by interaction of a first sensor unit of the sensor device with the encoder contour, and the second sensor signal is generated by interaction of the first sensor unit of the sensor device with the encoder contour.

\* \* \* \* \*